(12) United States Patent
Scheuerman et al.

(10) Patent No.: US 6,769,181 B1
(45) Date of Patent: Aug. 3, 2004

(54) CRIMPED-RING REMOVAL DEVICE

(76) Inventors: Michael L. Scheuerman, 219B-42nd Avenue S.W., Calgary, Alberta (CA), T2S 1A7; Darren L. Wendzina, 219-42nd Avenue S.W., Calgary, Alberta (CA), T2S 1A7

(*) Notice: Subject to any disclaimer, the term of this patent is extended or adjusted under 35 U.S.C. 154(b) by 0 days.

(21) Appl. No.: 09/332,128

(22) Filed: Jun. 14, 1999

(51) Int. Cl.[7] ................................................. B26D 3/16
(52) U.S. Cl. ........................... 30/92; 30/130; 30/92.5; 81/300
(58) Field of Search ........................... 30/92, 130, 90.2, 30/90.1, 357, 175, 186, 92.5, 187–193; 81/300, 405, 415, 418, 327, 389, 402

(56) References Cited

U.S. PATENT DOCUMENTS

| | | | |
|---|---|---|---|
| 45,496 A | 12/1864 | Herbert | |
| 73,528 A | 1/1868 | Hartford | |
| 86,138 A | 1/1869 | Copeland | |
| 86,322 A | 1/1869 | Rowe | |
| 124,654 A | 3/1872 | Anderson | |
| 134,440 A | 12/1872 | Roache | |
| 198,709 A | 12/1877 | Thornton | |
| 208,440 A | 9/1878 | Truland | |
| 259,895 A | 6/1882 | Miller | |
| 287,378 A | 10/1883 | Herbert | |
| 531,549 A | 12/1894 | McCarthy et al. | |
| 1,371,943 A | * 3/1921 | Sperdutti | 81/300 |
| 2,165,209 A | * 7/1939 | Badanza | 30/92 |
| 3,043,004 A | 7/1962 | Walter | |
| 3,057,232 A | * 10/1962 | Cornell, Jr. | |
| 3,568,314 A | * 3/1971 | Adams | |
| 3,965,570 A | * 6/1976 | Kozulla | |
| 4,026,018 A | 5/1977 | Byberg et al. | |
| 4,077,733 A | 3/1978 | Immonen | |
| 4,084,317 A | 4/1978 | Nakamura | |
| 4,135,299 A | 1/1979 | Moriarty | |
| 4,216,668 A | 8/1980 | Walton | |
| 4,312,127 A | * 1/1982 | Tanaka | 30/92 |
| 4,457,306 A | * 7/1984 | Borzone | 81/418 |
| 4,549,324 A | * 10/1985 | Liou | 30/92 |
| 4,791,925 A | 12/1988 | Mitterer | |
| 5,069,090 A | 12/1991 | Clark | |
| 5,121,624 A | 6/1992 | Haughian | |
| 5,203,083 A | * 4/1993 | Domonoske | 30/92 |
| 5,269,340 A | * 12/1993 | Drzewiecki | 30/92 |
| 5,289,712 A | 3/1994 | Haughian | |
| 5,365,625 A | 11/1994 | Han | |
| 5,398,718 A | 3/1995 | Roinick | |
| 5,743,131 A | 4/1998 | Holliday et al. | |
| 5,819,417 A | 10/1998 | Negus | |
| 5,862,593 A | * 1/1999 | Huang | 30/92 |
| 5,924,201 A | * 7/1999 | Wang | 30/92 |
| 5,987,750 A | * 11/1999 | Tally | 30/92 |

* cited by examiner

Primary Examiner—Kenneth E. Peterson
Assistant Examiner—Omar Flores-Sánchez
(74) Attorney, Agent, or Firm—Millen, White, Zelano & Branigan, P.C.

(57) ABSTRACT

Apparatus is provided for removing a crimped ring from plastic tubing installed over the nipple of a fitting. A supporting jaw radially supports the crimped ring while a chisel cuts the ring on a tangential path. One embodiment uses pair of levers joined and pivoted intermediate their ends. One lever forms the supporting jaw while the other forms the chisel. When actuated, the cutting jaw cuts the ring on a path tangent to the inside circumference of the ring, thereby avoiding injury to the fitting, the fitting therefore being reusable.

6 Claims, 6 Drawing Sheets

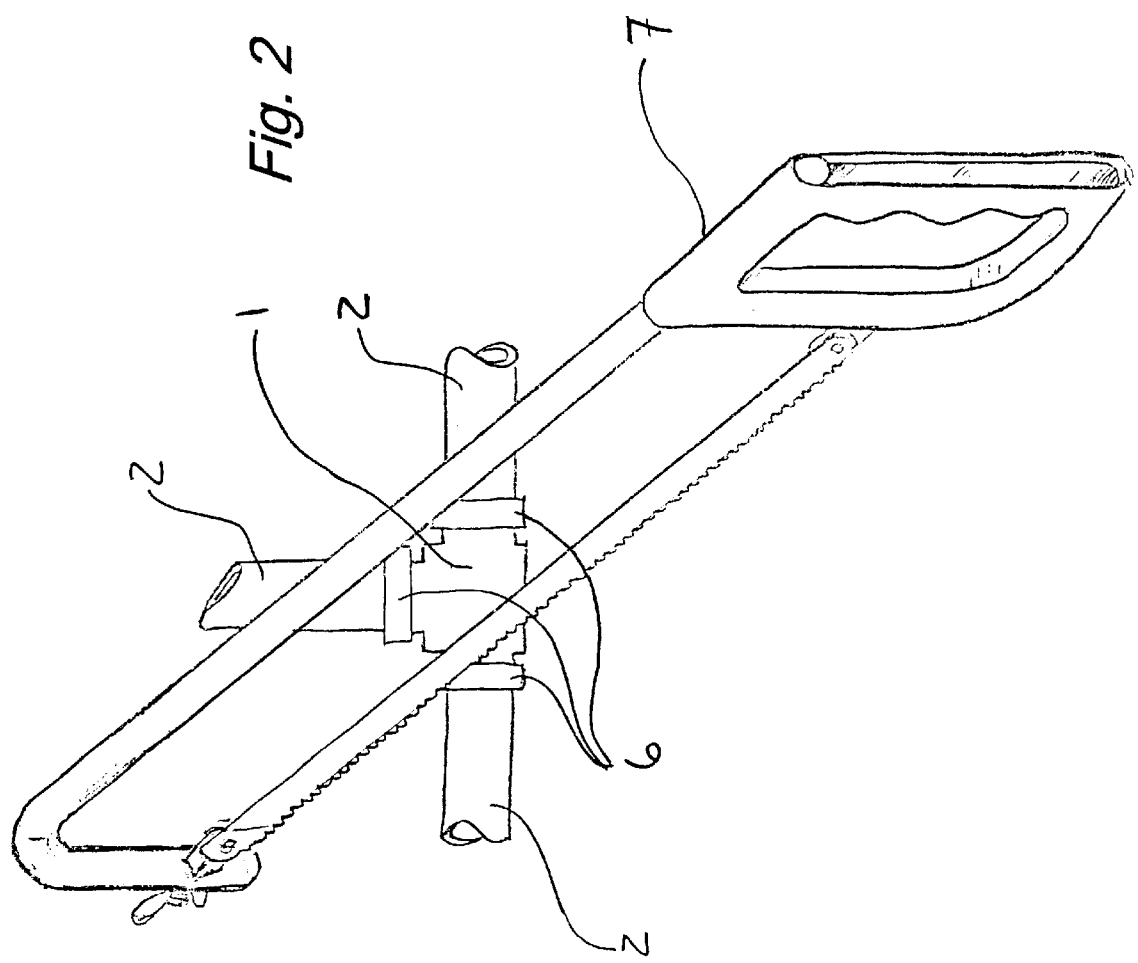

CRIMPED-RING REMOVAL DEVICE

FIELD OF THE INVENTION

This invention relates generally to a tool used to remove compressed rings from tubing joints. More specifically, this tool relates to the removal of crimped rings used to secure plastic plumbing pipe or tubing over a fitting.

BACKGROUND OF THE INVENTION

The introduction of plastic plumbing to the construction industry has resulted in a significant saving of time. The conduit used in plastic plumbing is referred by a variety of terms such as hose, piping or tubing. Steel piping requires a labor and time intensive fitting and threading process. Rigid copper piping avoids the threading process but replaces it with the need for soldering. Plastic tubing requires less fitting and the resulting joints are easy to complete. Tubing used for household plumbing is placed over a fitting's barbed or ribbed nipple and secured with a clamp of some sort.

It is known to crimp rings, such as annealed copper rings, over plastic plumbing tubing attached to the fitting's nipples, in order to provide a more secure joint. The tubing is resilient and is caused to deform over the ribs of the rigid nipple, preventing the tubing's removal therefrom. A number of tools have been developed to crimp the ring over the tubing and the nipple. One such tool is described in U.S. Pat. No. 5,289,712 to Haughian, wherein a lever type tool is used to apply pressure and reduce the diameter of the ring over the tubing, once positioned over a ribbed nipple. The tubing under the ring is permanently deformed.

Sometimes it is necessary to change the connection at the joint, to correct an error, alter the configuration, or merely to remove the fitting. Preferably the fitting is salvaged for reuse, due in part to economics but also to avoid the need to change all other joints on the affected fitting. Due to the deformation of the tubing at the old joint, the deformed part is usually cut off.

To change the joint, the crimped ring is removed before the tubing can be removed from the ribbed nipple. Currently, removal of these crimped rings presents a challenge, as most plumbers are forced to use a hacksaw to angle cut the ring from the tubing and the nipple. This may result in damage to the nipple as it is difficult to visualize the point at which the ring has been cut and the underlying nipple has not. The tubing offers little resistance to the hacksaw and one can cut through the tubing and into the nipple with little warning. Further, joints of this type are often too closely spaced or are located in areas with little space to maneuver a saw.

There are a number of tools used to hold and cut pipe or tubing, such as described in U.S. Pat. No. 287,378 to Herbert and U.S. Pat. No. 198,709 to Thornton. Generally, these pipe-cutting devices cut the pipe circumferentially. U.S. Pat. No. 45,496 describes a device which has a nearly tangential pipe thread cutting tooth. None of these tools could be used to remove a crimp ring from tubing. Further, tools which would apply a force perpendicular to the surface of the ring could result in deformation or damage to the fitting.

There is clearly a demonstrated need for a tool that can remove a crimped ring without damaging the underlying nipple and which is simple and easy to operate under a variety of conditions.

SUMMARY OF THE INVENTION

In a preferred embodiment, a device is provided for removing an annular ring from plastic tubing overlying a plumbing fitting. The device has the advantages of simplicity, ease of operation and does not risk injury to the fitting. In an embodiment implementing pivoting jaws and handles, the jaws are placed over the crimped ring and actuation of the handles allows one jaw to support the ring while the other cuts the ring on a path tangent to the inside circumference of the ring which thereby avoids injuring the fitting.

In a broad aspect then, apparatus is provided for cutting a crimped ring from an underlying cylindrical object, such as plastic tubing overlying a nipple, the apparatus comprising an annular recess for radially supporting at least a portion of the ring along its circumference and a ring-cutting chisel. Means are provided for actuating the chisel between resting and ring-cutting positions, preferably being a pair of pivoting levers, which form the recess and chisel portions. The chisel, when actuated from a resting position to a cutting position, engages and cuts through the ring across its width and along a path substantially tangent to the ring's inner circumference so as to leave the underlying circular object intact, the ring being supported by the annular recess.

Preferably, the actuating means are a pair of levers or a screw actuated chisel integrated into a unitary body. More preferably, serrations can be provided in the annular recess to prevent rotation of the ring while cutting.

BRIEF DESCRIPTION OF THE DRAWINGS

FIG. 1b is a cross-sectional view of the fitting, tubing and ring along line I—I of FIG. 1a;

FIG. 2 is a perspective view of a hacksaw example for removal of a crimped ring, according to the prior art;

DETAILED DESCRIPTION OF THE PREFERRED EMBODIMENT

Figure 1B:
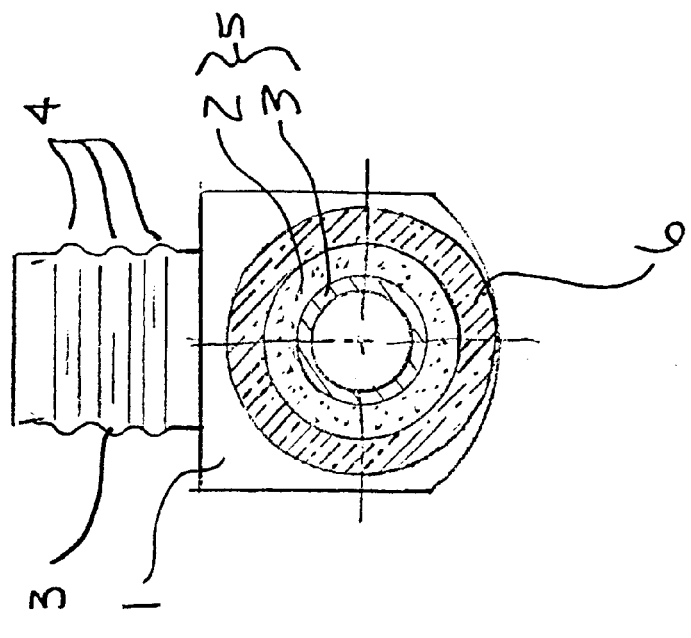
Figure 1A:
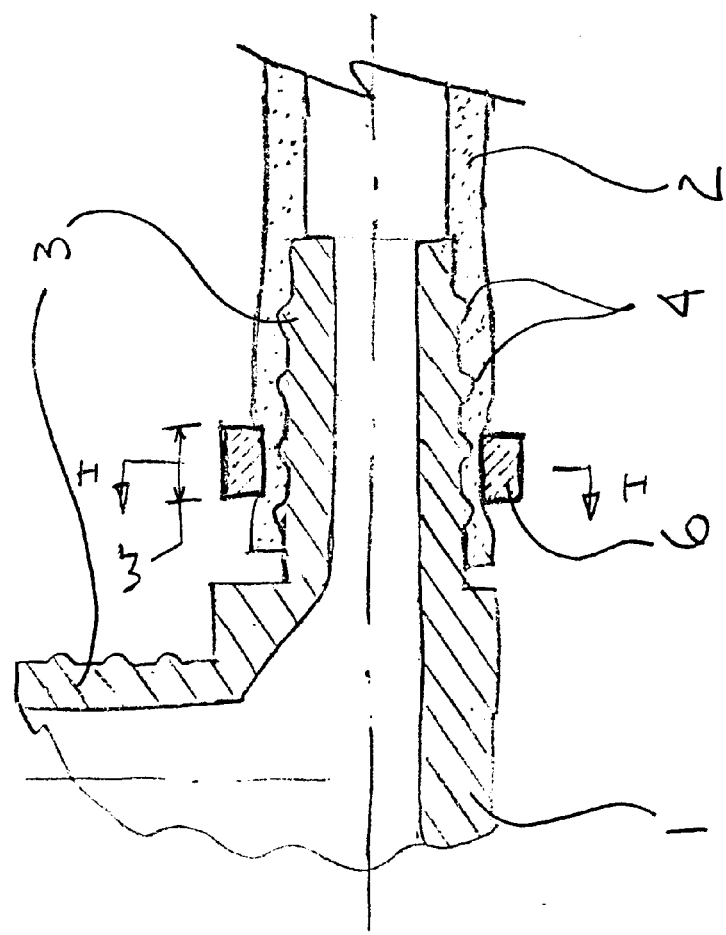
FIG. 1a is a partial side, cross-sectional view of a conventional plumbing fitting, plastic tubing and crimped ring.

Having reference to FIGS. 1a and 1b, in conventional plumbing, fittings 1 are used at joints in resilient, tubular plastic tubing 2. A contemporary example of such tubing is cross-linked polyethylene, most commonly used in configurations having ½" and ¾" inside diameters. The inside diameter or bore of the tubing 2 is placed over a cylindrical member 3. The member 3 could be a rigid cylindrical plug or a nipple 3 extending from the fitting 1. The member 3 has several barbs, serrations or circumferential ribs 4 spaced axially therealong. Hereinafter, the cylindrical member referred to herein is implemented as a nipple 3 having a bore for passing fluids coextensive with the tubing 2. Together, the nipple 3 and overlying tubing 2 form a cylindrical object 5.

The tubing 2 is secured to the nipple 3 with an annular ring 6. The ring 6 is placed concentrically over the cylindrical object 5 and compressed or crimped with a conventional crimping tool (not shown). The crimped ring 6 radially compresses the tubing 2 onto the nipple 3 and deforms it over the nipple's ribs 4. The crimped ring 6 is used only once and must be removed if the tubing 2 is to be separated from the nipple 3.

As stated above, a known prior art means of ring removal, as seen in FIG. 2, is to use a hacksaw 7 to cut across the width w of the crimped ring 6 at an angle. There is a risk that in attempting to cut the ring 6, both the tubing 2 and the nipple 3 may be cut requiring replacement of the fitting 1 and all three joints shown.

Having reference to FIGS. 3a–5, the present invention provides a device 11, which incorporates radial support means 8 for the ring 6 and a ring-cutting means 10. A portion of the outer circumference of the ring 6 rests against the support means 8 for radially supporting the ring 6. Actuating means 9 operate cutting means 10 between a resting position (FIG. 3a) and a ring-cutting position (FIG. 3b).

Figures 4A, 4B:
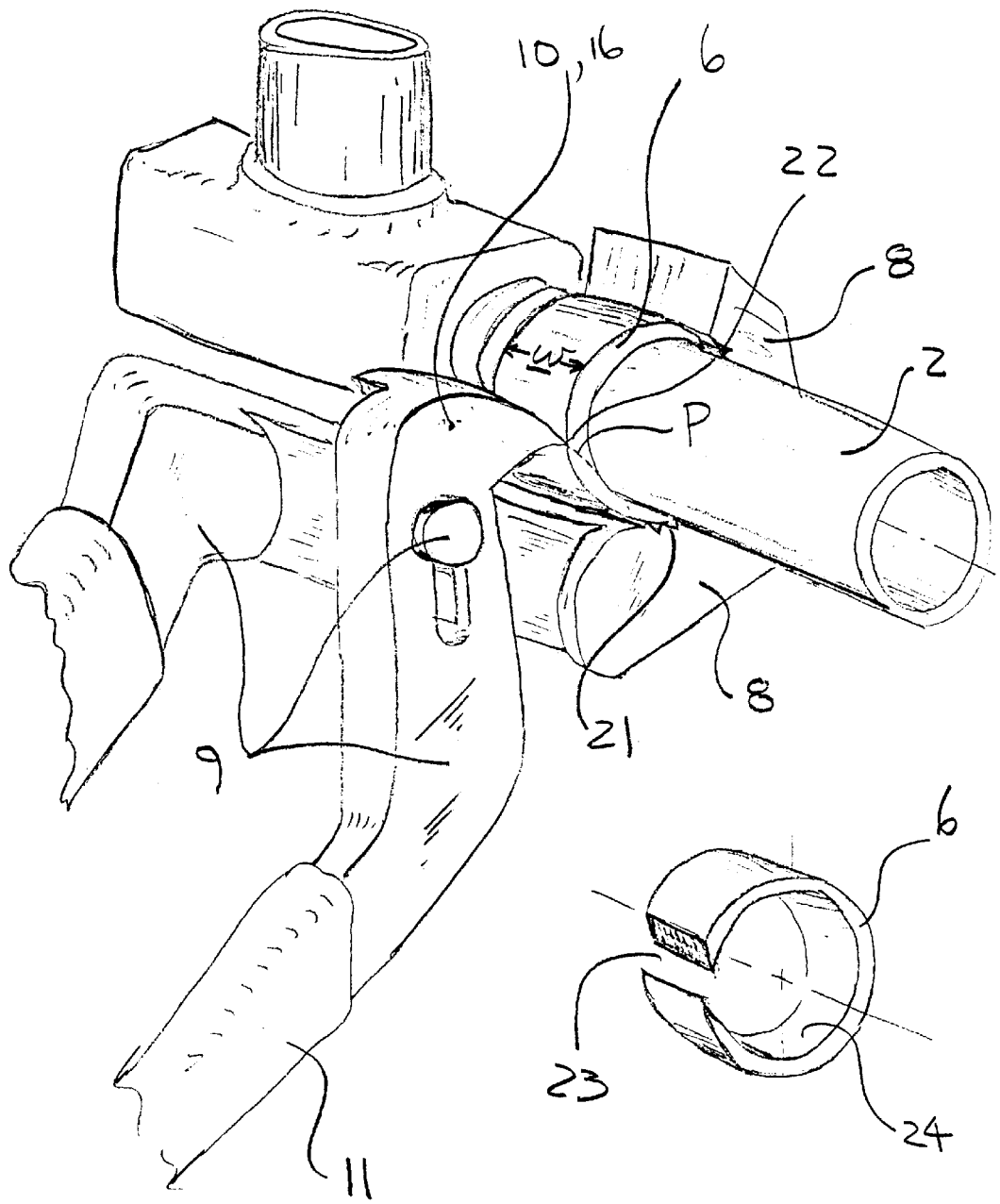
FIG. 4a is a partial perspective view of the embodiment according to FIG. 3a illustrating a partial fitting, tubing and crimped ring prior to cutting.
FIG. 4b is a perspective view of a crimped ring after it has been cut using an embodiment of the invention.
Figure 5:
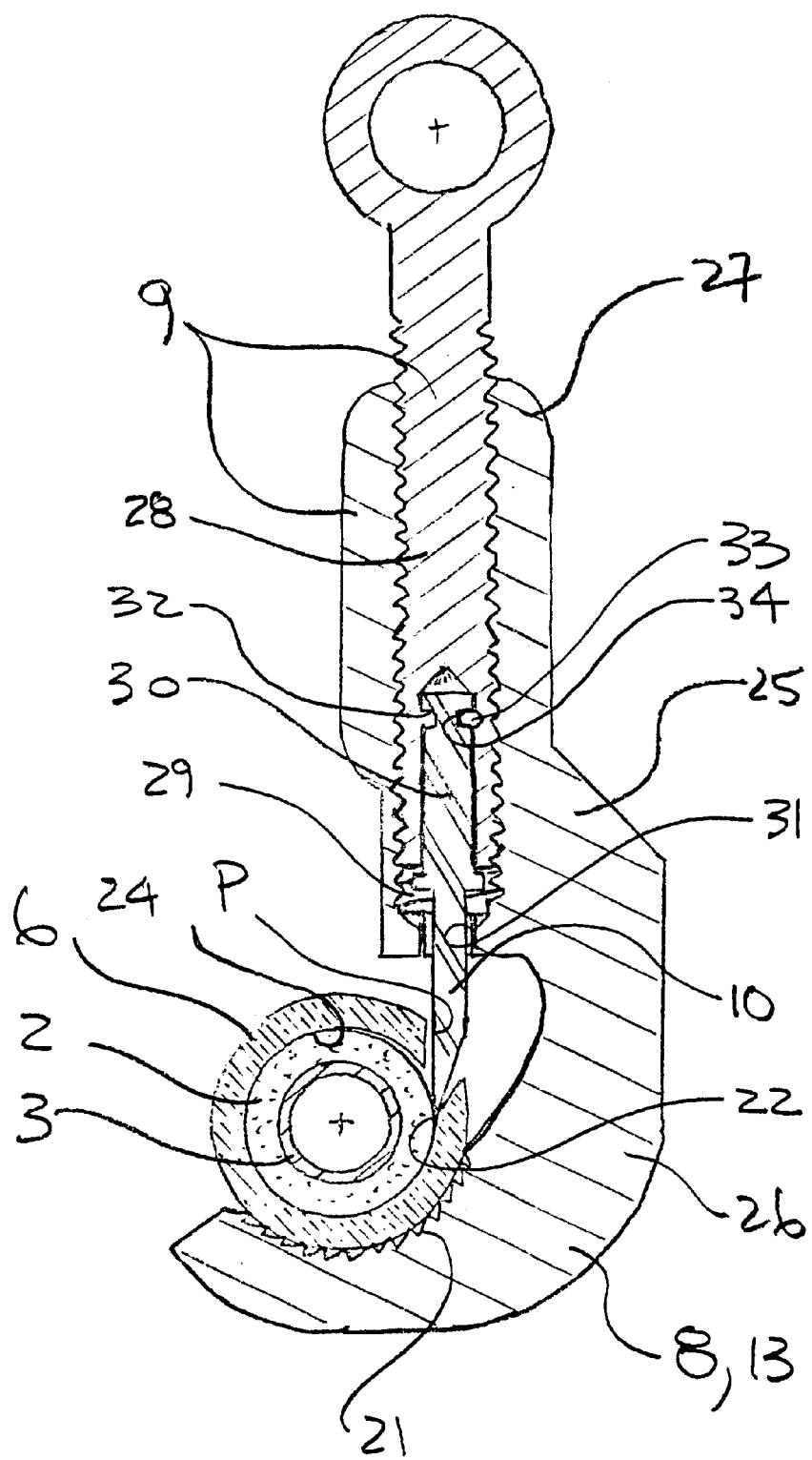
FIG. 5 is a side cross-sectional view of a screw-type embodiment of the invention.

As shown in FIGS. 4a and 5, when actuated, the cutting means 10 are driven into the ring 6, across its width w, and along a path P substantially tangent to the inside circumference of the annular ring 6. Cutting reaction forces (including torque), imposed upon the ring 6, tubing 2 and fitting 1, are radially resisted by the support means 8.

The arrangement of the support and cutting means 8,10 are described in detail as follows.

In one embodiment of the invention, shown in FIGS. 3a through 4a, a crimped-ring removal device 11 is shown. Support means 8 are shown to comprise a first lever 12, on one end of which a ring support in the form of a supporting jaw 13 having a ring supporting surface 13a thereon is formed, and on the other end a handle 14 is disclosed. A second lever 15 has a blade or chisel 16 formed on a chisel support 15a at one end as the cutting means 10, and on the other end is formed a handle 17.

The two levers 12,15 are joined with a pivot 18 intermediate along their length which allows the device 11 to be actuated to drive the chisel 16 into the ring 6. Slot 19 aids in placing the jaws over the ring 6. The slot is inoperative during cutting. The ring 6, the underlying tubing 2, and the nipple 3 rest in an annular recess 20 in the supporting jaw 13 which acts as the support means 8. The annular recess 20 and supporting jaw 13 provide support against the radial force resulting when the chisel 16 bears down on the ring 6 in the cutting position (FIG. 3b).

While the resulting frictional forces are significant and usually sufficient to prevent rotation of the ring 6, the supporting jaw 13 optionally includes serrated teeth 21 to further prevent reactive rotation of the ring 6 during cutting (see FIGS. 4a and 5).

Best shown in FIGS. 4a and 4b, the chisel 16 has a linear cutting edge 22 for making a single cut 23 through the annulus of and across the width w of the ring 6. The resulting cut is substantially parallel to the axis of the ring 6. Adding angle to the edge may assist in the cutting, but a greater stroke would be required between resting and cutting positions.

Figure 3A:
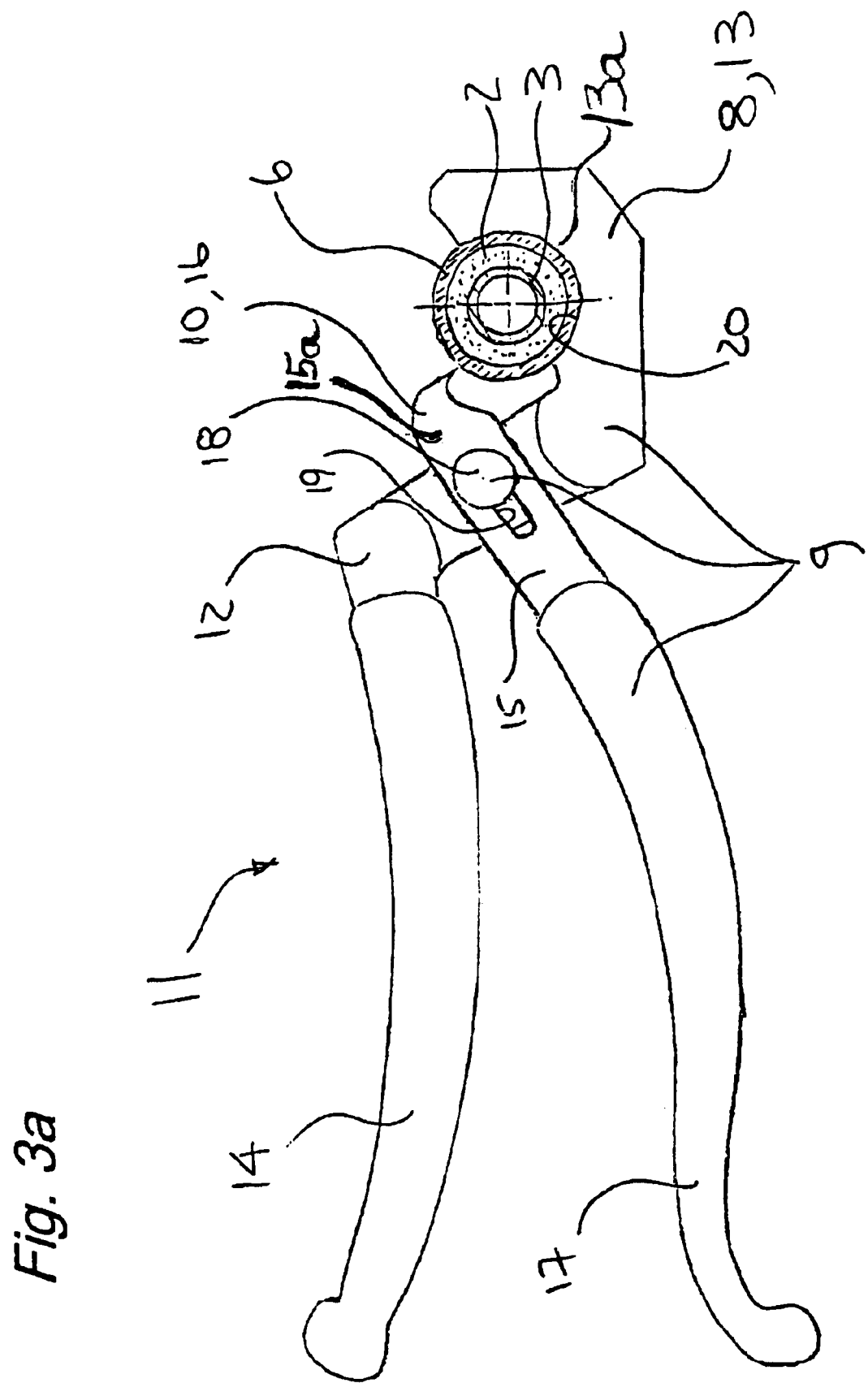
FIG. 3a is a side view of one embodiment of the invention illustrating the resting position prior to cutting of the ring.
Figure 3B:
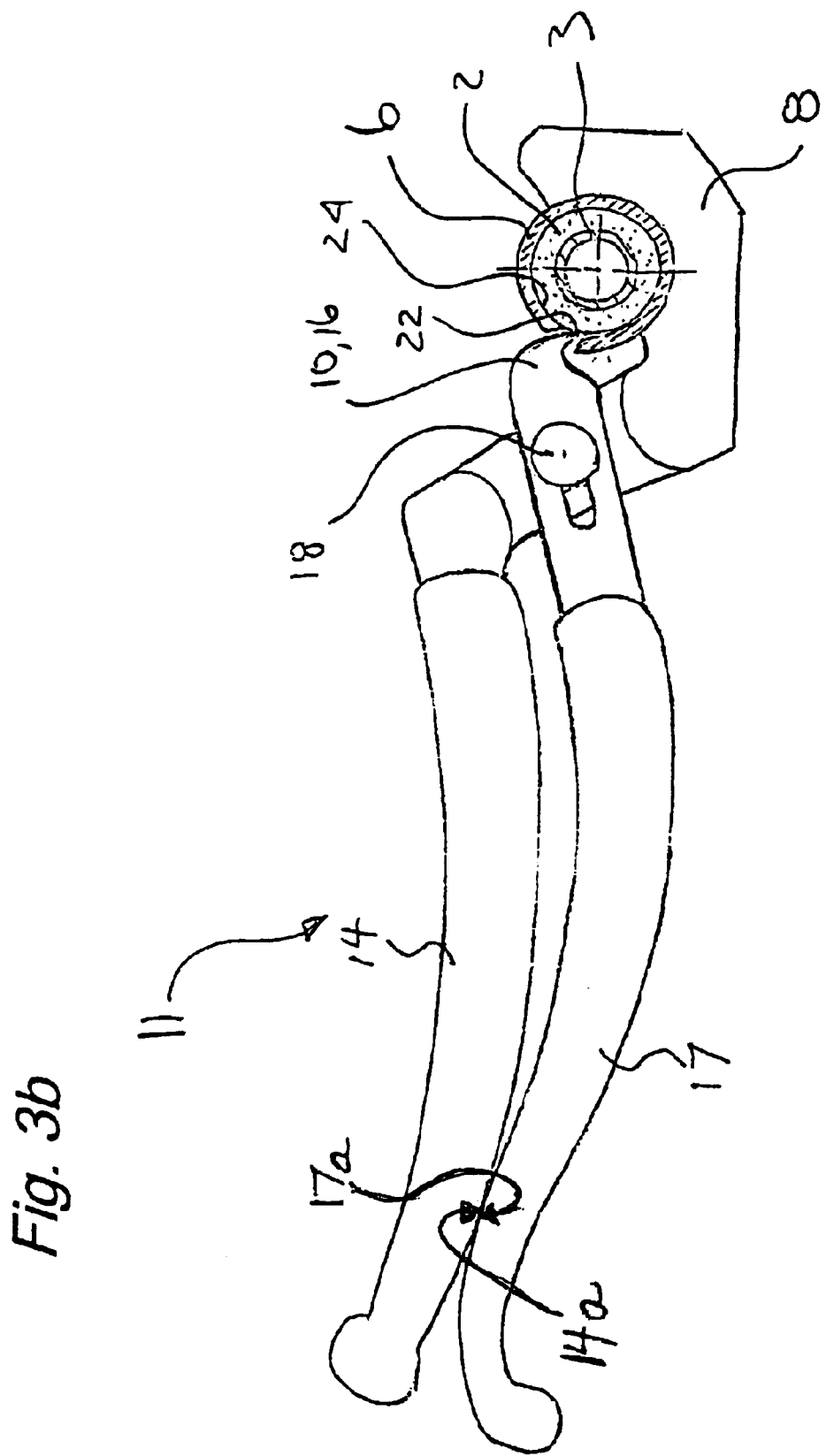
FIG. 3b is a side view according to FIG. 3a, illustrating cutting position wherein the ring is severed.

In operation, FIG. 3a shows the device 11 in a non-actuated, or resting position. When the handles 14,17 of levers 12,15 are actuated by squeezing them together, the device is actuated to the cutting position.

Then, as shown in FIGS. 4a and 3b, the chisel 16 and pivot 18 are arranged so that when operated between the resting and cutting positions, the chisel 16 is pivoted to strike the ring 6 and proceed therethrough on a path P substantially tangent to the ring's inner diameter or circumference 23. The cutting path P enables cutting of the ring 6 without cutting the underlying nipple 3. The chisel 16 could encroach on the already deformed resilient tubing 2.

In another embodiment of the invention, best seen in FIG. 5, the support means 8, a supporting jaw 13, and the chisel 16 are provided in a unitary C-shaped body 25. Note that the same reference numerals are used when the elements have the same function as in the earlier embodiment.

The supporting jaw 13 is formed in the body's lower end 26 of the body 25 and the actuating means 9 is formed at the body's upper end 27. The actuating means 9 comprises a linear screw actuator 28, housed in a threaded bore 29 in the body's upper end 27. As in the first embodiment, the cutting means 10 is a chisel 16 formed on a bit 30. The bit 30 moves axially, but does not rotate, within bore 29 so as to ensure the chisel's cutting edge 22 cuts across the ring's width w. The bit 30 is prevented from rotating by guide means 31 formed in the body's upper end 27, aligning the chisel's edge 22 substantially parallel to the ring's axis.

Means 34 connect the linear screw actuator 28 and the bit 30 so that the bit 30 both advances and retracts with the actuator. Connecting means 34 permits relative rotation of the rotating screw actuator and non-rotating bit.

One form of connection means 34 is shown as an annular groove 32 at the end of the bit 30 opposite the chisel 16 and having a transverse locking pin 33 installed through the screw actuator 28 to engage the annular groove 32 in the bit 30.

Although several preferred embodiments of the present invention have been disclosed above, it is clear to those of ordinary skill in the art that other embodiments are possible which do not vary from the spirit and scope of the present invention. For example, other forms of actuating means are possible which support a ring and actuate the chisel along the described path; the chisel can be skewed slightly to increase the point load, yet still cut across the ring's width; or a spring return can be added to the chisel of the embodiment depicted in FIG. 5 rather than the connection means 34.

The embodiments of the invention in which an exclusive property or privilege is being claims is detailed as follows:

1. A plumbing tool for removing an annular ring fit concentrically over underlying cylindrical tubing which receives a rigid nipple therein, the ring having an axis, an inner circumference, an outside radius and a width, the plumbing tool comprising:

a ring support having an arcuate surface of a radius complementing the radius of the ring for radially supporting a portion of the ring in non-rotatable relationship relative to the ring support;

a chisel support having a chisel fixed with respect thereto, the chisel support being coupled to the ring support by a compound coupling spaced from both the chisel and the annular surface allowing the chisel that is fixed to the chisel support to move with a rectilinear component with respect to the arcuate surface and pivotally with respect to the arcuate support, the rectilinear component facilitating positioning the ring on the arcuate surface and the pivoting facilitating severance of the ring;

a first lever extending from the compound coupling and connected directly to the ring support;

a second lever extending from the compound coupling and connected directly to the chisel support, and a stop for limiting motion of the chisel and arcuate surface toward one another;

whereby moving the first and second levers toward one another by squeezing the levers together seats the ring against the arcuate surface of the ring support and causes the chisel to sever the ring, while the stop substantially limits further motion of the chisel with respect to the arcuate surface after the ring has been severed.

2. The plumbing tool of claim 1 wherein the compound coupling is a pin-in-slot connection.

3. The plumbing tool of claim 1 wherein the chisel is fixed to the support by being unitary therewith.

4. The plumbing tool of claim 1 wherein the stop for limiting motion of the chisel and arcuate surface is provided by abutment of opposed surfaces on the levers.

5. The plumbing tool of claim 1, wherein the first lever is unitary with the ring support and the second lever is unitary with the chisel support.

6. The plumbing tool of claim 1, wherein there are serrations in the arcuate surface of the faclitation gripping of the ring.

* * * * *